US005233167A

United States Patent [19]

Markman et al.

[11] Patent Number: 5,233,167

[45] Date of Patent: Aug. 3, 1993

[54] MULTI-FUNCTION TERMINAL

[75] Inventors: Herbert L. Markman, Wynnewood; Eugene C. Morris, Harleysville, both of Pa.

[73] Assignee: Positek Incorporated, Norristown, Pa.

[21] Appl. No.: 719,775

[22] Filed: Jun. 24, 1991

[51] Int. Cl.[5] .......... G06F 15/20

[52] U.S. Cl. .......... 235/375; 235/380; 235/472; 902/22

[58] Field of Search .......... 235/472, 380, 375; 902/22; 364/405

[56] References Cited

U.S. PATENT DOCUMENTS

| | | | |
|---|---|---|---|
| 3,916,386 | 10/1975 | Teixeira et al. | 235/472 |
| 4,092,527 | 5/1978 | Leucke | 364/709 |
| 4,274,081 | 6/1981 | Nomura et al. | 340/153 |
| 4,374,381 | 2/1983 | Ng et al. | 340/711 |
| 4,415,065 | 11/1983 | Sandstedt | 186/39 |
| 4,482,955 | 11/1984 | Amano et al. | 364/200 |
| 4,569,421 | 2/1986 | Sandstedt | 186/39 |
| 4,589,069 | 5/1986 | Endo et al. | 902/22 |
| 4,633,227 | 12/1986 | Menn | 340/365 VL |
| 4,766,418 | 8/1988 | Dowsett et al. | 340/365 R |
| 4,885,580 | 12/1989 | Noto et al. | 341/23 |
| 4,908,612 | 3/1990 | Bromley et al. | 340/706 |
| 4,912,309 | 3/1990 | Danielson et al. | 902/22 |

*Primary Examiner*—Harold Pitts

*Attorney, Agent, or Firm*—Eckert Seamans Cherin & Mellott

[57] ABSTRACT

A multi-function terminal having a built-in microprocessor for use as a point of sale station in a retail goods or services facility. The terminal has a membrane keyboard with arrays of keys for data entry, arranged in key blocks. The individual key blocks preferably relate to particular attributes of the goods or services as well as processing costs. A particular designation of the keys can be changed by substituting a replaceable overlay. The overlays are sized to cover individual key blocks. The terminal also has a magnetic strip and bar code reader and decoder. The terminal can drive two printers through parallel ports. The terminal also has circuitry for driving an LED display and facilities for accepting various types of monitor drivers for driving a video monitor. The terminal interfaces with a host computer which controls operating parameters such as the mapping of characters to particular keys and the decoding convention used by the bar code and magnetic stripe decoders. The terminal further controls a cash drawer. Battery backup is provided to retain during a power failure the operating parameter set by the host computer.

28 Claims, 3 Drawing Sheets

MULTI-FUNCTION TERMINAL

BACKGROUND OF THE INVENTION

1. Field of the Invention

This invention relates to the field of data entry terminals. More particularly, the invention relates to programmable data entry terminals having additional functions including video monitor and display drivers, plural printer interfaces, readers for encoded information and a cash drawer opening signal output, useful as a point of sale terminal for a retail establishment.

2. Description of the Prior Art

Prior art point of sale terminals for use in retail establishments emulate basic cash register functions. A clerk using the terminal as a cash register generally enters the coded identity and/or price of the goods or services purchased by a customer by depressing numeric keys to input transaction data, for calculating a monetary value. The keypad for entering this data is standardized, usually as a square or rectangular array of pushbuttons with function keys (e.g., "+", "−", "total", "subtotal", etc.) immediately associated with the numeric keys.

The traditional cash register kept running totals but the hard copy record of the transaction was merely a paper receipt or cash register "tab" and only included a notation that a sale was made of one or more items, at costs which were itemized, and the total of the sale. With the advent of computers, more complex computerized inventory control and reporting systems became available. Relatively more complex keyboards and scanners were provided for entering data pertaining to a transaction, possibly including the monetary value of the transaction and articles or services purchased, and at least including sufficient information to input the price or a code identifying the article or service such that the price can be obtained via data stored in memory. The systems thus typically include mass memory means such as disc or tape storage, and permanently record successive transaction information. A hard copy printer is included and can provide the retailer and the customer with a hard copy record of the transaction.

For data entry with a minimum of keystrokes, point of sale stations can include items such as bar code or magnetic strip scanners for reading and quickly inputting data encoded on articles in inventory. Such systems are fast and accurate, but require that encoded tags or labels be included. It would be advantageous to provide additional input means enabling transactions to be customized while still minimizing the number of keystrokes required of the operator.

Modern point of sale terminals are typically modular and permit needed features such as scanners, printers and the like to be included as add-ons to a basic terminal unit. Generally, the systems have a host computer with I/O ports dedicated to interfacing, for example, with a peripheral magnetic strip or bar code reader, a printer, a cash drawer controller and various other drivers. Compatibility between the host computer and peripheral devices such as monitors, drivers, decoders and keyboards is of great concern. The number and character of the peripheral devices is generally dictated by the I/O ports available on the computer, some being disposed for serial communications, some for parallel communications, etc. Where the number of peripheral devices is increased, it is generally necessary to include a corresponding circuit card in the computer to accommodate the feature, such as an asynchronous serial card, a modem card or the like.

Various devices for entering data and controlling the operation of the host computer are present in the prior art. U.S. Pat. No. 4,092,527 —Luecke discloses providing a calculator with interchangeable keyboards having different preselected configurations of numeric and/or function keys.

U.S. Pat. No. 4,274,081 —Nomura et al discloses a data input apparatus including a keyboard and a plurality of interchangeable mats which define the function of the keyboard keys.

U.S. Pat. No. 4,374,381 —Ng et al discloses a touch terminal which communicates with and controls a microprocessor. The microprocessor controls a bar code reader, a keyboard and I/O communication ports. The I/O ports and bar code reader are not disclosed as being integral to the keyboard.

U.S. Pat. Nos. 4,415,065 and 4,569,421 —Sandstedt disclose hand held data entry terminals. The terminals include dual I/O ports, a keyboard, an attached bar code scanning wand, an on-board microprocessor and a printer.

U.S. Pat. No. 4,482,955 —Amano et al discloses a keyboard having an on-board microprocessor for controlling keyboard functions. The keyboard microprocessor communicates with an external CPU via the I/O ports.

U.S. Pat. No. 4,633,227—Menn discloses a keyboard having user selectable keyboard arrangements. Each key of the keyboard has an indicating area for displaying the designation or symbol for the key. This designation is changed whenever a different key arrangement is selected.

U.S. Pat. No. 4,766,418 —Dowsett et al discloses a keyboard having on board micro-computers and a plurality of data communication ports.

U.S. Pat. No. 4,885,580 —Noto et al discloses a keyboard device having LCD driving circuits, an on-board CPU and various I/O ports.

U.S. Pat. No. 4,908,612 —Bromley et al discloses a computer I/O keyboard device. The device has a keyboard, a number of drivers for driving terminal displays, a driver for an audio speaker, and an interface port for interfacing the device with a host computer.

The foregoing references disclose various attributes of point of sale terminals, however, there remains a need for a programmable remote terminal for interfacing with a host computer with drivers for driving a plurality of printers, a video monitor, a cash drawer, and also having a built-in magnetic stripe and bar cord reader, and a port for attachment of a bar code reading wand, wherein the terminal is both generally and specifically adapted to customization for the particular business of the retailer.

The present invention improves prior art data entry terminals useful as point of sale terminals by providing a multi-function terminal particularly suited for use as a point of sale station to be coupled to a single port of a host computer and containing a magnetic stripe and bar code reader, a keyboard programmably alterable for a variety of customized uses, and drivers and ports for video monitors, printers, LED displays and cash drawers. The invention reduces the cost of a point of sale station by integrating the interface and peripheral devices needed in a point of sale terminal and allowing the plurality of devices to be operated by a single serial computer port. The invention at the same time provides a generally applicable terminal device, and a means by which the terminal device can be specifically customized to the nature of the retail establishment, thus reducing costs and increasing the level of customization at the same time.

SUMMARY OF THE INVENTION

It is a general object of the invention to provide a generally applicable programmable terminal which is customizable to the nature of a retailer's business.

It is an object of the invention to provide a programmable terminal having a built-in microprocessor and a keyboard for data entry wherein the terminal is coupleable together with other similar terminals to a port of a host computer.

It is also an object of the invention to provide a terminal particularly suited for use as a point of sale station by providing the terminal with a bar code and magnetic strip reader and by providing the terminal with various drivers and ports for controlling peripheral devices associated with the point of sale station.

It is also an object of the invention to provide a programmable terminal having a keyboard which in conjunction with a host computer is programmable to change the data associated with a particular keystroke.

A further object of the invention is to provide a terminal having overlays to easily modify key designations.

The foregoing objects are achieved in a point of sale terminal device as disclosed and claimed. The invention is housed in a small, modular unit suitable for placement on a desk or countertop. An RS232 port couples the processor of the terminal to an appropriate RS232 serial port on a host computer. Preferably the unit has two parallel printer ports for driving multiple printers and a display port for interfacing the terminal to a video monitor. Connections are provided for an outside DC power source, or alternatively a DC power supply can be included for connection to the AC mains.

The top surface of the terminal unit is dominated by a membrane keyboard. Keys on the keyboard are arranged in blocks, and overlays are provided for placement over key blocks to identify individual keys of a block. For example where the terminal is to be used in a retail dry cleaning establishment, overlays specific to clothing types, colors, processing requirements and due dates can be provided. The particular overlays can be substituted according to terminal usage. For example, an overlay used to designate colors on a terminal in a retail dry cleaners can be substituted by one appropriately marked to designate, for example, film exposure amounts, film types, number of copy requirements and the like on a terminal to be used by a photo finisher. By choice of suitable overlays, the keyboard (and therefore the point of sale terminal) is readily tailored to the particular type of retail business in which it is used.

An on-board microprocessor controls terminal I/O functions. The microprocessor is coupled in data communication with the host computer whereby the host computer essentially controls terminal operation. For example, the keyboard keys generate a particular code such as an ASCII character when depressed. The code or ASCII character generated by a particular key is selectively changeable upon command from the host computer. The invention further includes a slot through which an encoded card may be passed. The information may be encoded on a magnetic stripe or by a bar code or OCR character. For this reason, the terminal has a reader head for optical codes such as bar code and also for electromagnetic codes such as magnetic strip. A bar code decoder and a mag strip decoder are coupled to the respective read heads for decoding the encoded information. In addition, a bar code scanning wand is coupled to the bar code decoder for reading bar codes on items other than cards which cannot be passed through the slot in the terminal or are more conveniently read apart from the slot reader.

The terminal may be used in conjunction with any type of monitor. The terminal interchangeably accepts a number of monitor driving boards such as VGA boards, CGA boards, EGA boards and TTL driver boards. The terminal can also be programmed by the host computer to emulate various other terminals.

The terminal of the invention can also incorporate a built-in line driver. The line driver allows the terminal to communicate with a remote host computer located over a mile away, rather than the usually applicable limit of twenty-five to thirty feet.

Since the terminal is particularly adapted to be used in a retail establishment, it can appropriately control opening of a cash drawer. Cash drawers are commonly openable in one of two ways. Certain types of cash drawers are adapted to open upon reception of a simple DC signal or supply voltage at an input. For instance, a +12 volt level applied to a proper pin on the cash drawer operates a solenoid biased against a spring to release the drawer, which then opens due to the bias of a further spring. Alternatively, the cash drawer may be a "smart" cash drawer which requires a particular binary code and internally gates power to a solenoid when the proper code is received and decoded. The terminal of the invention preferably includes power supply means for the cash drawer, or alternatively the drawer can be powered separately. To open a "smart" cash drawer, the particular binary code can be generated by the host computer rather than the terminal. The terminal passes the binary code on to the cash drawer, whereby the drawer controller decodes the code and opens the drawer.

Also in conjunction with the intended use of the terminal, a driver means is provided for operating an LED or LCD display sign which can be mounted near the terminal and used instead of or in addition to a video terminal. The built-in microprocessor and driver be arranged to operate the display sign to provide messages to customers rather than to the operator, and these messages may or may not be related to the particular transaction taking place. For example, sale prices, upcoming specials and product promotions, the locations or particular classes of articles in the store, and other information can be displayed in this manner.

This summary provides a brief overview of the multifunction terminal of the invention. The invention is unique in incorporating various components and necessary features of a point of sale station into one compact self-contained and readily customized unit.

DESCRIPTION OF THE PREFERRED EMBODIMENTS

The device according to the invention is a multiplexing, multi-function terminal coupleable to a host computer, including a membrane keyboard having a plurality of keys, a microprocessor, a read slot including at least one read head for reading encoded information passed through the slot, at least one decoder for decoding encoded information read by the at least one read head, a display driver and port for driving an LED display, a cash drawer port and means for driving an electrical signal through the port to open a cash drawer upon command from the microprocessor and a line driver enabling coupling of the terminal to a remote host computer.

Figure 1:
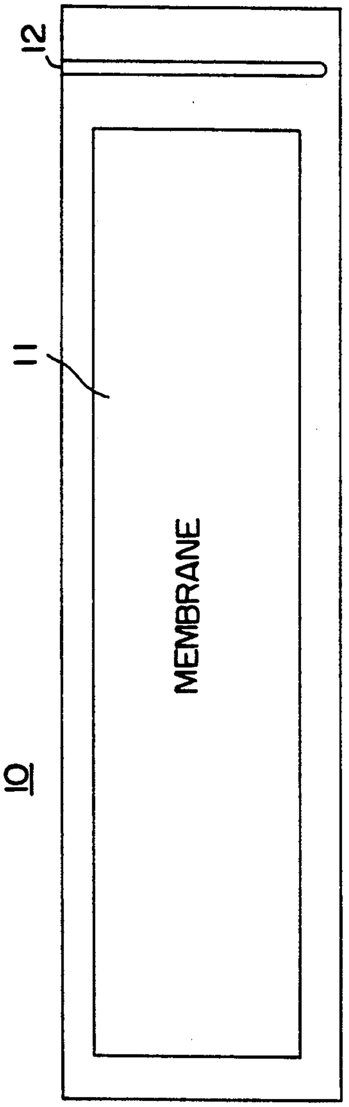
FIG. 1 is a top view of a point of sale terminal device according to the invention.
Figure 2:
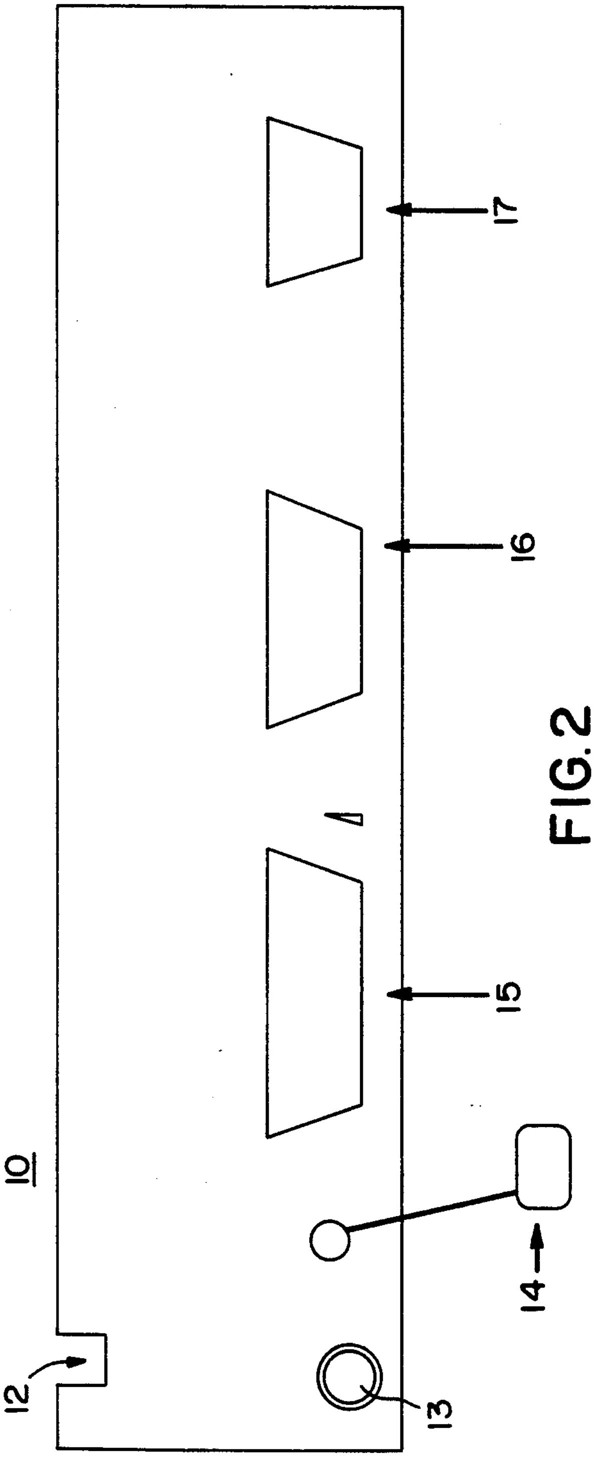
FIG. 2 is a rear view of the terminal device.

FIGS. 1 and 2 respectively show a top view and a back view of terminal. As shown in FIG. 1, the top of terminal 10 is dominated by membrane keyboard 11. Also shown in FIG. 1 is slot 12. An operator can slide a card or tag containing encoded information through slot 12. Reading and decoding sensors and circuits internal to terminal sense and process encoded information contained on the card or tag whereby it is quickly and correctly entered into the terminal or host computer system. Preferably the encoded information relates to an article or service being sold in a transaction, in particular identifying the article or service whereby the system can convert the identifying information into price and processing data relating to the transaction.

FIG. 2 is a rear view of terminal 10. Terminal 10 has power port 13 for accommodating power source wiring for powering terminal 10. The wiring can carry direct current from an external DC source to directly power the many elements of terminal 10. Alternately, terminal 10 can contain its own power supply, e.g., a transformer and rectifier combination for converting AC mains power to a DC voltage level, or a regulator for stepping down and/or filtering DC power supplied at the power input port 13.

Although terminal 10 contains a built-in microprocessor for controlling many of its functions, the functions of the built in microprocessor are preferably limited, and the system as a whole operates in accordance with commands issued by a host computer coupled to the terminal, and potentially additional terminals, via RS232. cable 14. RS232 cable 14 has a standard D type RS232 connector and a conductors coupled to asynchronous communications circuitry in terminal 10.

Terminal 10 can be programmable to emulate other forms of terminals to provide compatibility with various types of host computers. In this manner, the terminal can be interfaced to existing customer computer equipment, thus minimizing expense.

The terminal is capable of controlling multiple printers. Printer ports 15 and 16 are, respectively, parallel female 25 pin and 15 pin ports for receiving a connector for coupling with a printer cable. The multiple printers can be used, for example, for making separate records for use by the customer and the establishment, or for printing in different formats, for example alphanumeric data or bar code. The rear of terminal 10 also has monitor interface port 17 for coupling to a video monitor. Monitor interface port 17 is preferably a standard female 9 pin connector.

Figure 3:
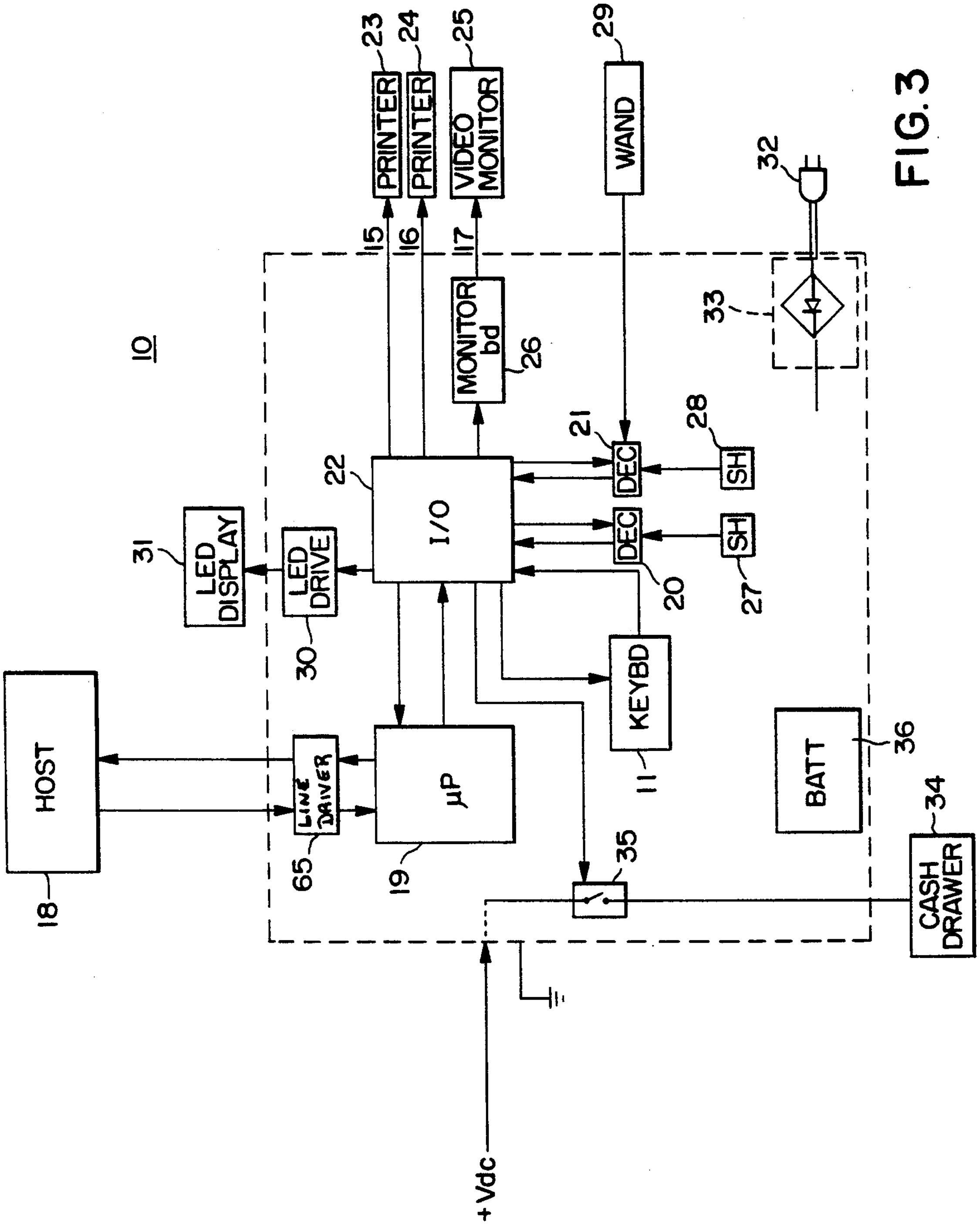
FIG. 3 is a block schematic diagram of the terminal device.

FIG. 3 is a block diagram of the internal components and peripherals associated with terminal 10. Host computer 18 and internal microprocessor 19 are coupled via a bi-directional communication link. Line driver 65 is coupled in series between host computer 18 and microprocessor 19. Line driver 65 is essentially a level booster or amplifier and maintains sufficient strength of signals travelling in either direction between host computer 18 and microprocessor 19 for operation at the required data rate over a long transmission line. The inclusion of line driver 65 permits connection of the terminal to a host computer stationed miles away. Host computer 18 issues commands to microprocessor 19 signalling microprocessor 19 to take certain actions such as for uploading information or modifying terminal operation. Microprocessor 19 can send verification signals to host computer 18 verifying that data was correctly received and/or that the required action has been taken. Among the actions that can be taken by microprocessor 19 as discussed further hereinafter are set up of keyboard 11, magnetic decoder 20, and bar code decoder 21. Microprocessor 19 is preferably coupled with I/O board 22 for interfacing with the plurality of peripheral components. Among the peripheral components driven are printer 23 and 24. Printer 23 is coupled to terminal 10 via printer port 15 and printer 24 is coupled to terminal 10 via printer port 16.

It is advantageous to include video monitor 25 for immediately displaying information respecting a transaction, including information entered into terminal 10 or output to terminal 10 by host computer 18. Video monitor 25 is selectable from a variety of available video monitors. To adapt terminal 10 to one of the plural conventions available for video monitor 25, terminal 10 accepts and interconnects with monitor board 26. Monitor board 26 can be adapted to drive the monitor according to CGA, VGA, EGA or TTL conventions, providing RGB or baseband video signals to the monitor. Terminal 10 is easily opened and monitor board 26 is easily accessible for installing or changing the type of monitor board 26.

Terminal 10 can accept a monitor board 26 identical to a monitor driving board in the host computer. Further, a plurality of terminals 10 are coupleable to the host computer; each capable of being outfitted with an identical monitor board 26 as is present in the host computer. Accordingly, the multi-user system provided can be interfaced to a plurality of identical video monitors. The resultant consistency of video monitors throughout a multi-user system has not before been available. Such consistency is highly desirable resulting in savings in cost (since a plurality of monitors can be purchased, possibly at a reduced cost per monitor) and increased efficiency since operaters only need to become familiar with a single brand and type of monitor.

Besides entering data to terminal 10 via keyboard 11, the terminal is capable of reading encoded information and loading the information into the host computer 18. Coded information can be magnetically encoded or optically coded on a card, tag or label. Magnetic scan head 27 and bar code scan head 28 are positioned within the terminal adjacent slot 12 in the terminal housing. Bar code scan head 28 comprises a light source such as a scanning laser and a photodetector and amplifier coupled to a threshold detector or the like, for reading information encoded optically in a bar code. Magnetic scan head includes an inductor coupled to an amplifier and threshold detector for similarly discriminating data encoded in a ferrous strip. The coded information read by magnetic scan head 27 and bar code scan head 28 are decoded by, respectively, magnetic decoder 20 and bar code decoder 21. The decoded information is passed through I/O board 22 to on-board microprocessor 29 and preferably on to host computer 18. To read bar codes on items such as large packages or large printed sheets which are inconvenient or impossible to scan in the slot reader, scanning wand 29 is provided. Scanning wand 29 is of the known type passable over a bar code for reading the bar code. Information read by scanning wand 29 is passed to bar code decoder 21 and processed in the same manner a data from the slot reader.

Magnetically encoded and bar code encoded information can be encoded according to number of coding conventions. Accordingly decoders 20 and 21 preferably can be set up by the on-board microprocessor 19 under host computer 18 command to be compatible with the coding convention required.

The terminal is intended to be used at a point of sale station to enter customer transactions. It is preferable to include at the point of sale station an illuminated display for communicating information to customers. Information which can be displayed includes sale prices, upcoming specials, product promotions, product locations, store hours and other pertinent information. Accordingly, the invention includes a display driver for an LED or LCD display with information downloaded from host computer 18. The host computer can handle changing of the display on a message by message basis, or can download messages to be stored by the microprocessor, and displayed by the microprocessor in turn or in reaction to particular functions being effected at the terminal.

The numerous components of terminal 10, such as microprocessor 19, decoders 20 and 21, display driver 30, etc. are all active devices requiring supply of power. The terminal can therefore be powered by one or more external DC power supplies. Alternatively, the components of a DC power supply, i.e., one or more transformers, a rectifier bridge, and filtering capacitors can be incorporated within the case of terminal 10, having sufficient capacity to power a full complement of peripheral devices. In this manner terminal 10 can be plugged directly into a typical wall socket coupled to the domestic AC mains using plug 32. A drawback to incorporating power supply 33 in the case of terminal 10 is the added weight, particularly where the supply is large enough to handle all the possible peripherals even though not all may be included in a particular implementation. Power supplies also are apt to dissipate heat.

Consistent with its use at a point of sale station, terminal 10 controls opening of cash drawer 34. Typical cash drawers open upon application of a DC voltage level to control or power a solenoid latch mechanism for releasing the drawer to open under force from a spring. The voltage level used to open cash drawer 34 is derived from the DC source voltage used to power many of the components in terminal 10 or alternatively, from power supply 33. The voltage is input to a terminal of a normally open switch 35. Switch 35 is preferably an electronic switching means which couples the supply voltage to the opening mechanism upon receipt of a signal. Switch 35 is thus closed upon command of microprocessor 19 through I/O board 22 to provide cash drawer 34 with a DC voltage level to open cash drawer 34. For so-called smart cash drawers, a gating arrangement can be included to decode a code received from the host computer, the output of the gating arrangement being coupled to the switching means.

Keyboard 11 contains a plurality of keys. Depression of a particular key outputs a particular code such as an ASCII character. The correspondence or mapping of the keys to the codes or ASCII characters generated by the keyboard in response to depression of particular keys is changeable via commands downloaded from host computer 18. After a particular key mapping instruction is downloaded from the host, the keys of keyboard 11 will continue to output the particular ASCII character to which they have been assigned until host computer 18 downloads commands to modify the output. However, if terminal 10 loses power and the key mapping is stored in volatile memory, the particular code or ASCII character assignment could be lost by terminal 10 causing arbitrary or default characters to be output upon depression of the keys of keyboard 11. For this reason, backup battery 36 preferably is provided to render the memory storage means of the terminal nonvolatile. Backup battery 36 powers at least certain memory elements of terminal 10 in the event of a power outage on the AC mains, whereby the ASCII character designations will remain as programmed by host computer 18. Alternately, the particular keyboard key designations desired can be stored in nonvolatile memory or even permanently stored such as in an EPROM. Of course permanent storage precludes the possibility of remapping the key designations.

Figure 4:
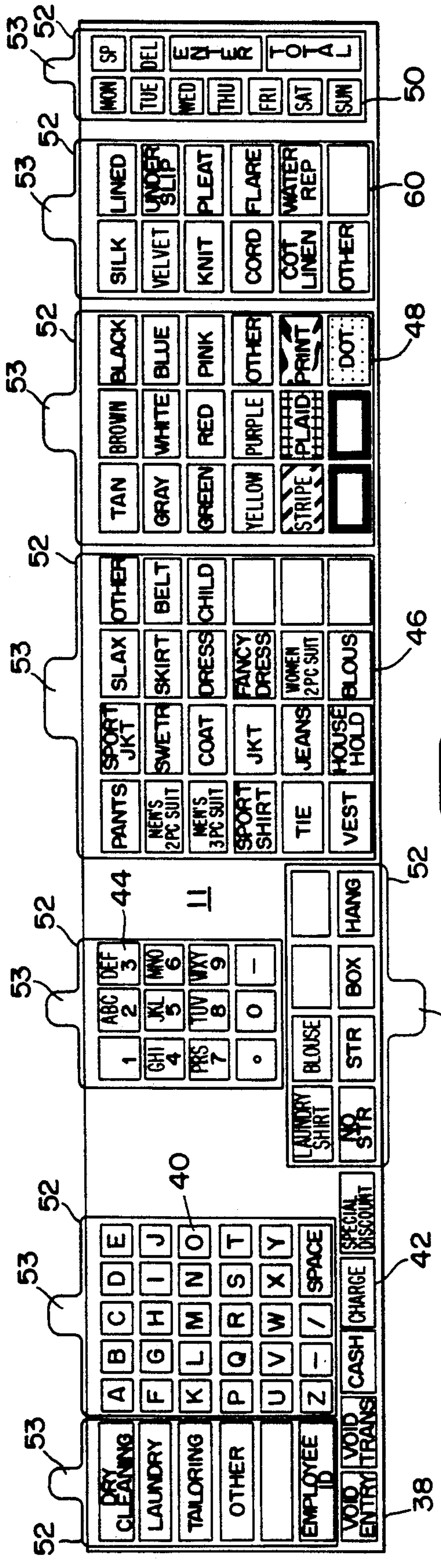
FIG. 4 is a top view of the terminal of the invention, showing overlays in place for key identification, the overlays being particularly suited for use in a retail dry cleaning establishment.

A keyboard having inserts particularly suited for use in a retail dry cleaning establishment is shown in FIG. 4. Keyboard 11 is laid out such that the operator can progress from left to right (or top to bottom, etc), making one or more selections from each of the grouped blocks of switch pads while completing the transaction. The switches themselves are preferably membrane switches. If desired, data entry can be prompted by backlighting the next sequential block (or blocks) of switch pads, under control of microprocessor 19 to lead the operator through the steps associated with the transaction. According to the preferred layout, as shown in FIG. 4, the attendant progresses from left to right, entering in order: the type of laundry (at area 38); one or more words or names to be associated with the customer (at letter block 40); the type of transaction (block 42); the number (block 44), and type (block 46) of articles; descriptions of the colors or patterns of the articles (block 48) and the types of fabrics (block 60); and, the date of required completion (block 50). These pieces of information are used not only to record the transaction but also affect the price to be charged to the customer. Entry of the data allows immediately calculation of the price to be charged to the customer, and enables feeding forward of information to assist in planning the scheduling or batching of articles to be processed in various laundry handling machines.

Figure 5:
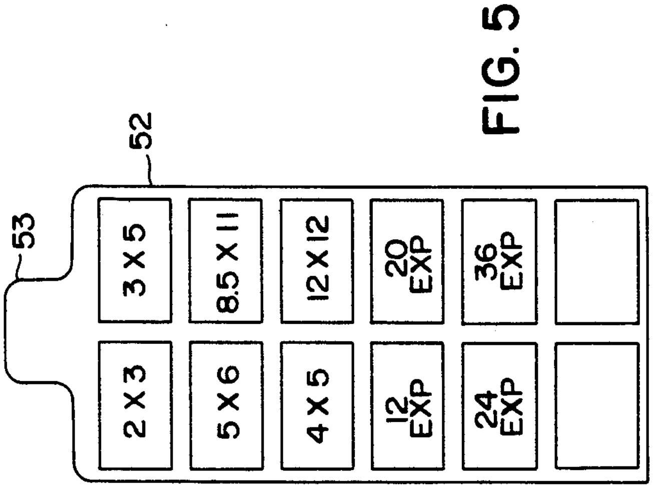
FIG. 5 is a top perspective view of an overlay for identifying a key block of a terminal particularly suited for use in a photo finishing establishment.

Keyboard 11 is covered by a plastic sheet. The sheet is affixed to the keyboard along three sides of each key block. The sheet is not affixed at a side of the key blocks near an edge of keyboard 11. In this manner overlays 52 are simply insertable into the pockets formed by the sheet. Overlays 52 have tabs 53 for insertion and withdrawal of overlays 52 from the pockets formed by the sheet on the top of keyboard 11. A variety of overlays can be provided, bearing markings appropriate to the intended use of terminal 10. For instance, an overlay usable in a terminal for installation at a photo finishing store is shown for example in FIG. 5. By inserting overlay 52 over key block 60, the key designations can be changed to identify the size of print required, the film type, due date and/or the number of exposures on the roll. It can be seen that a great variety of overlays can be produced whereby the terminal is useful in virtually any retail establishment and readily accommodates the information pertinent thereto. For instance, overlays containing menu items can be produced for using the terminal in a restaurant. Overlays designating automobile services can be used in conjunction with the terminal located in an automobile repair facility or the like.

It can be appreciated from the above that the invention provides a standardized multi-function terminal which at the same time is readily customized for use as a point of sale station for any retail establishment. The invention efficiently combines components useful in a point of sale station in a single, modular integrated unit. Its novel design simplifies station set-up and significantly decreases cost.

While specific embodiments of the invention have been described in detail, it will be appreciated by those skilled in the art that various modifications and alternatives could be developed in light of the overall teachings of this disclosure. The particular arrangements disclosed are meant to be illustrative only and not limiting as to the scope of the invention which is to be given the full breadth of the appended claims and any and all equivalents thereof.

What is claimed is:

1. A multiplexing terminal coupleable to a host computer, comprising:
- a microprocessor operable to communicate with the host computer and with a plurality of peripheral components coupled to the microprocessor, said peripheral components including:
- a keyboard having a plurality of keys grouped into at least one block;
- a means for reading encoded information;
- means for decoding the encoded information;
- driving means for driving an LED display;
- a cash drawer port and means for driving an electrical signal through said port to open a cash drawer upon command from the microprocessor;
- a line driver enabling coupling of the terminal to a remote host computer; and,
- an interchangeable video monitor driving circuit for driving a remote video monitor, and wherein the microprocessor is arranged to control and communicate with the peripherals for obtaining, processing and displaying data respecting a retail transaction, under control of the host computer.

2. The multiplexing terminal of claim 1 wherein said keys are arranged to generate encoded characters when depressed, the characters including ASCII characters.

3. The multiplexing terminal of claim 1, wherein said terminal is programmable by communication from said host computer to remap correspondence of signals generated by depressing the keys to encoded characters generated by the keys.

4. The multiplexing terminal of claim 3, further comprising changeable key overlays bearing indicia for identifying the keys, said key overlays being insertable over said at least one key block for changing a descriptive designation of keys in said key block.

5. The multiplexing terminal of claim 1 wherein said at least one means for reading comprises a read head for reading a magnetic stripe and a read head for reading a bar code.

6. The multiplexing terminal of claim 5 further comprising a bar code reading wand for scanning bar codes, said wand coupled to said means for decoding.

7. The multiplexing terminal of claim 1, wherein said video monitor driving circuit is selectable from a group comprising a VGA driver, a TTL driver, a CGA driver and an EGA driver, and produces one of an RGB output and a baseband video output.

8. The multiplexing terminal of claim 1, wherein the interchangeable video monitor driving circuit is substantially identical to a video monitor driving circuit in the host computer.

9. The multiplexing terminal of claim 1 wherein said electrical signal is a code, and further comprising means for decoding the electrical signal for opening a smart cash drawer upon reception of a pre-determined said code.

10. The multiplexing terminal of claim 1 wherein said electrical signal is a pre-determined DC voltage level applied to said cash drawer by switching means in the terminal.

11. The multiplexing terminal of claim 1 further comprising a DC power supply.

12. The multiplexing terminal of claim 1 further comprising a plurality of parallel printer driving ports.

13. The multiplexing terminal of claim 1 wherein said at least said means for decoding is programmable by said host computer for selectively decoding one of a plurality of coding conventions.

14. The multiplexing terminal of claim 1 further comprising memory means and a battery for providing back-up power to the memory means upon loss of main power.

15. The multiplexing terminal of claim 1 wherein the terminal is programmable by the host computer to emulate other terminals.

16. The multiplexing terminal of claim 1 wherein the terminal is a point of sale device for entering transactions, the terminal having alpha-numeric keys and keys specific to one of attributes of articles involved in the transaction and attributes of the transactions.

17. The multiplexing terminal of claim 16, adapted for use in a retail dry cleaning operation, the articles being articles to be cleaned and the attributes including articles types, colors, patterns, fabrics, special requirements and delivery requirements.

18. The multiplexing terminal of claim 16 adapted for use in a photo processing operation, the articles being film to be processed and the common attributes including film type, exposure amounts, finish requirements, photograph size, special requirements and delivery requirements.

19. The multiplexing terminal of claim 1 wherein the means for reading encoded information includes a read slot in the terminal for accepting an encoded information carrier.

20. The multiplexing terminal of claim 19 wherein the carrier is one of a card, tag and label.

21. A mutiplexing terminal coupleable to a host computer, comprising:
- a microprocessor operable to communicate with the host computer and with a plurality of peripheral components coupled to the microprocessor, said peripheral components including:
- a keyboard having a plurality of keys grouped into at least one block, an individual key outputting an ASCII character upon depression, the terminal programmable by the host computer to selectively vary the ASCII character output by the individual key;

insertable key overlays insertable over said at least one key block for changing a descriptive designation of a plurality of keys in said key block;

a magnetic stripe reader disposed adjacent a read slot in the terminal, said read slot accepting an encoded information carrier;

a bar code reader disposed adjacent said read slot;

magnetic stripe decoding means;

bar code decoding means a bar code scanning and reading wand coupled to said bar code decoding means;

driving means for driving an LED display;

a cash drawer port and means for driving a D.C. signal level through said port upon command from said microprocessor to open a cash drawer;

a line driver enabling coupling of the terminal to a remote host computer;

an interchangeable video monitor driving circuit for driving a video monitor; and, a plurality of parallel printer driving ports.

22. The multiplexing terminal of claim 21 wherein said driving circuit is selectable from a group comprising a VGA driver, a TTL driver, a CGA driver and an EGA driver.

23. The multiplexing terminal of claim 21 wherein said interchangeable video monitor driving circuit is substantially identical to a video monitor driving circuit in the host computer.

24. A multi-user system coupleable to a host computer, comprising:

a plurality of multiplexing terminals, each of said terminals having a microprocessor operable to communicate with the host computer, said microprocessors each able to communicate with a plurality of peripheral components coupled to said microprocessors, said peripheral components including:

keyboards having a plurality of keys grouped into one block;

means for reading encoded information;

means for decoding the encoded information;

driving means for driving LED displays;

cash drawer ports and means for driving an electrical signal through said ports to open cash drawers upon command from a microprocessor coupled to said cash drawer port;

line drivers enabling coupling of said terminals to a remote host computer;

an interchangeable video monitor driving circuit in each of said terminals for driving a plurality of remote video monitors, each of said video monitor driving circuits of the type present in the host computer wherein the multi-user system is interfaced to a plurality of video monitors of like convention and wherein the microprocessors are arranged to control and communicate with peripherals for obtaining, processing and displaying data respecting a retail transaction occurring at any of a plurality of remote locations, under control of the host computer.

25. The system of claim 24 wherein said video monitor driving circuits are selectable from a group comprising VGA drivers, TTL drivers, CGA drivers and EGA drivers.

26. The system of claim 24, wherein said means for reading and decoding includes a magnetic stripe reader disposed adjacent a read slot in the terminals, said read slot accepting an encoded information carrier, bar code reader disposed adjacent said read slots, magnetic stripe decoding means and bar code decoding means.

27. The system of claim 24 wherein said plurality of remote video monitors are identical.

28. The system of claim 24 wherein video monitors of different convention are substitutable into the multi-user system by replacing a monitor board present in the host system and replacing the interchangeable video monitor driving circuits in each of said terminals with video monitor driving circuits having a convention identical to that of the monitor board placed into the host system.

* * * * *